United States Patent [19]

LaVergne, Jr.

[11] E Patent Number: Re. 31,753

[45] Reissued Date of Patent: Dec. 4, 1984

[54] METHOD OF HOLLOW ARTICLE CASTING

[75] Inventor: Joseph M. LaVergne, Jr., Spanaway, Wash.

[73] Assignee: Joseph M. LaVergne, Sr., Spanaway, Wash.

[21] Appl. No.: 505,711

[22] Filed: Jun. 20, 1983

Related U.S. Patent Documents

Reissue of:

[64] Patent No.: 3,542,914
Issued: Nov. 24, 1970
Appl. No.: 692,940
Filed: Dec. 22, 1967

[51] Int. Cl.[3] ..... B28B 1/14; B29C 7/00

[52] U.S. Cl. ..... 264/250; 249/144; 264/35; 264/273; 264/233

[58] Field of Search ..... 264/250, 267, 249, 268, 264/269, 32, 34, 334, 274, 35, 273, 233; 52/2, 19, 20, 88, 139, 140, 245; 403/265-267, 269; 249/83, 66 R, 98, 118, 161, 144

[56] References Cited

U.S. PATENT DOCUMENTS

| | | | |
|---|---|---|---|
| 871,655 | 11/1907 | Winslow | 52/137 |
| 1,060,347 | 4/1913 | Massey | 52/251 |
| 1,188,759 | 6/1916 | Guay | 264/79 |
| 1,254,153 | 1/1918 | Nelson | 264/32 |
| 1,983,758 | 12/1934 | Hick | 425/454 |
| 2,228,123 | 1/1941 | McMurray | 249/68 |
| 2,278,089 | 3/1942 | Nottingham | 249/166 |
| 2,556,594 | 6/1951 | McDonnell | 249/153 |
| 2,680,276 | 6/1954 | Filangeri | 249/64 |
| 2,683,298 | 7/1954 | Fadden | 249/186 |
| 2,834,089 | 5/1958 | Bast | 249/162 |
| 2,888,819 | 6/1959 | Sitton | 52/309.16 |
| 2,894,311 | 7/1959 | Sinclair | 249/151 |
| 2,903,777 | 9/1959 | Mitchell | 425/439 |
| 2,955,341 | 10/1960 | Sinclair | 249/97 |
| 3,136,024 | 6/1964 | La Monica | 249/66 R |
| 3,163,910 | 1/1965 | Greene | 249/52 |
| 3,206,532 | 9/1965 | Nottingham et al. | 264/334 |

OTHER PUBLICATIONS

"Popular Hand Book for Cement and Concrete Users" (1911), pp. 294-299.

Concrete Information-Portland Cement Assoc. "Concrete Curb Retaining Walls," 2 pages.

Article entitled "Design of Concrete Airport Pavement," copyright 1955 by Portland Cement Assoc.

Concrete Information-Portland Cement Assoc.; entitled "Rectangular Concrete Tanks," 2 pages.

Article entitled "Concrete Culverts and Conduits" published by Portland Cement Assoc.

Concrete Engineers "Handbook" (1918), pp. 765-771.

Part No. VI, "Reinforced Concrete Engineering of Technical Instruction Arranged for Home Study," 1931, 5 pages.

"Design of Concrete Structures" (1926) pp. 350-363.

Concrete Pipe Handbook (1951) pp. 306-309.

*Primary Examiner*—Willard E. Hoag
*Attorney, Agent, or Firm*—Delbert J. Barnard

[57] ABSTRACT

An outer mold part is positionable over an inner mold part. Lever means are carried on opposite sides of the outer mold part and operable by a lifting force to exert a separating force between the outer and inner mold parts. Lever means are carried by the outer mold parts for locking the molded article to it. The outer mold part and the molded article are lifted upwardly together as an assembly and are removed entirely from the inner mold part. The assembly is then set down, the outer mold part is unlocked from the molded article, the outer mold part is then picked up and removed from the molded article, and then the bottom is poured in and is connected to the molded article.

18 Claims, 10 Drawing Figures

METHOD OF HOLLOW ARTICLE CASTING

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to a method of casting septic tanks.

Description of the prior art

Fadden 2,683,298; Sinclair 2,894,311; La Monica 3,136,024; Green 3,163,910 and Nottingham 3,206,532 are illustrative of the known prior art relating to techniques and apparatus for casting septic tanks and similar types of hollow articles. The disadvantage of the casting apparatuses of the types shown by Fadden 2,683,298, La Monica, 3,136,024 and Nottingham 3,206,532 are that one or both of the mold parts are of sectional construction and must be dismantled as a part of the process of removing the molded article from the casting apparatus. Sinclair 2,894,311 and Green 3,163,900 each disclose a casting apparatus comprising inner and outer mold parts, each of which are of one piece construction. However, in both the molded tank must be picked up by itself and removed from the inner mold part. Also, the Greene apparatus is designed to form only one-half of the molded article at a time.

SUMMARY OF THE INVENTION

The hollow article casting method of the present invention is adapted for upright casting of the top and side wall portions of a septic tank or a similar type hollow article. It may be practiced by apparatus comprising inner and outer mold parts, each of which is of one-piece construction. The outer mold part is positionable over the inner mold part to form with the inner mold part a mold cavity between the two. Means are provided for locking the septic tank or other molded article to the outer mold part. At least one of the mold parts carries force means for forcing the outer mold part, with the molded article locked to it, apart from the inner mold part. The outer mold part is provided with lifting means, so that it and the molded article may be lifted together, as an assembly, and totally removed from the inner mold part, to be set down at a site apart from it. The locking means is then disengaged so that the outer mold part may be lifted upwardly free of the molded article, which remains at rest on the ground. The casting of the tank is then completed by pouring a bottom in the tank while it remains at rest in an upright position.

BRIEF DESCRIPTION OF THE DRAWING

In the drawing like element designations refer to like parts, and.

DESCRIPTION OF PREFERRED EMBODIMENTS

Figure 1:
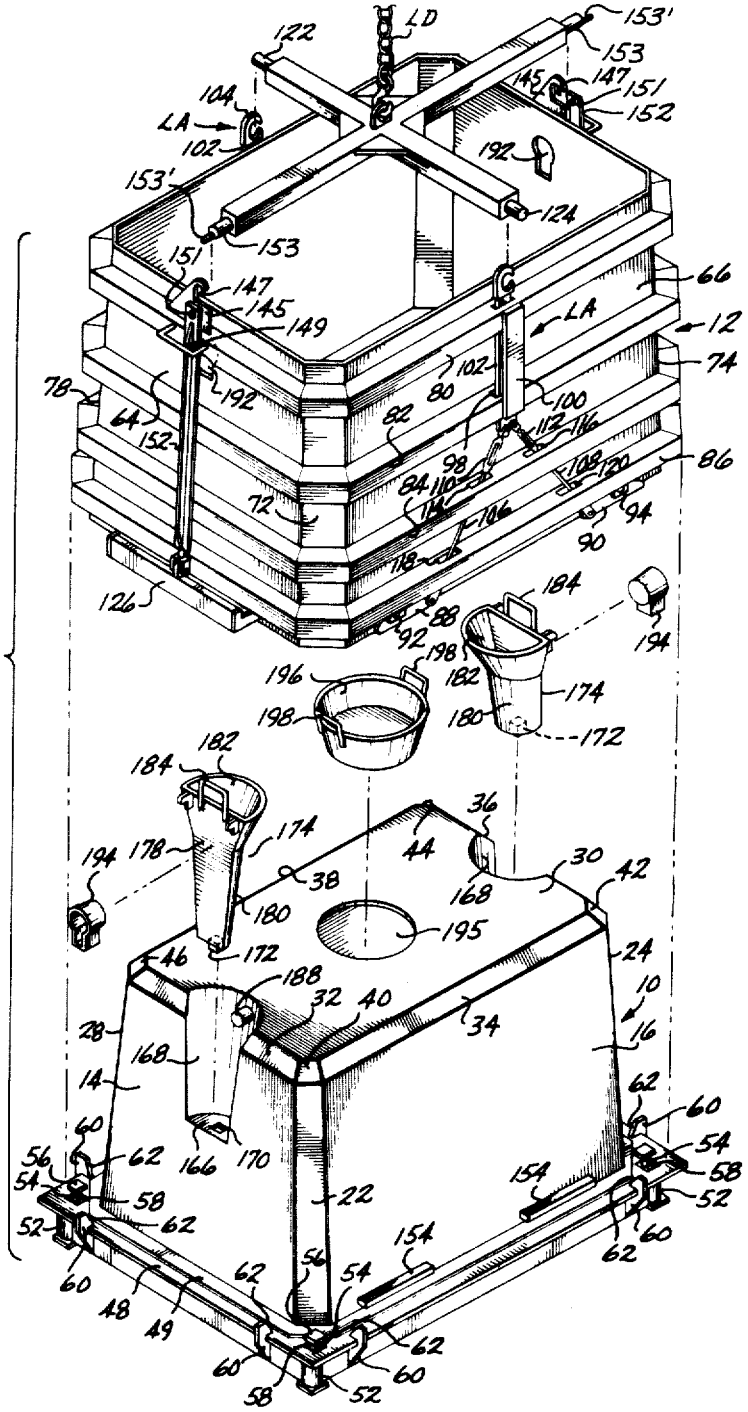
FIG. 1 is an exploded perspecitve view of the several components of a hollow article casting apparatus adapted to practice a technique of the invention.

The illustrated casting apparatus comprises inner and outer mold parts 10, 12, respectively. Each mold part 10, 12 is of one piece, as opposed to sectional, construction. The outer mold part 12 is sized to fit over the inner mold part 10 and to define therewith a mold cavity for forming the side wall and top portions of a septic tank.

The inner mold part 10 includes four side walls or panels 14, 16, 18, 20 and four corner walls or panels 22, 24, 26, 28. All of these walls lean inwardly from vertical a slight amount so as to provide a small breakaway angle or taper all about the inner mold part 10, so as to facilitate separation of the molded article from the inner mold part 10. The four side walls 14, 16, 18 and 20 and the four corner walls 22, 24, 26, 28 are joined to a top panel 30 by upper edge panels 32, 34, 36, 38, 40, 42, 44, 46, respectively. The basic form of the inner core part 10 may be described as a slightly upwardly tapering hexahedron having chamfered edges.

Figure 7:
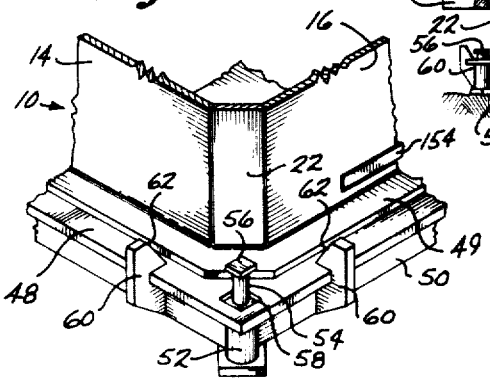
FIG. 7 is a fragmentary view of a corner portion of the inner mold part, showing the placement of a separating ram at such corner and cam type guides on opposite sides of the corner, for guiding the outer mold part into proper spacing relative to the inner mold part.

Inner mold part 10 includes a peripheral base flange 48 extending completely supported on a relatively husky base frame 50. Preferably, a vertically oriented piston-cylinder type fluid motor 52 is housed in each corner portion of the base frame 50, with the piston thereof directed upwardly. As most clearly shown by FIG. 7, each piston 54 may have a head portion 56 and the base flange 48 may include a recess 58 at each corner for receiving and accommodating the head portion 54 when the piston 52 is retracted. The fluid motors 52 constitute one type of means for exerting a separating force between the inner and outer mold parts 10, 12, as will hereinafter be explained in greater detail.

Preferably, a locating cam 60 is spaced inwardly a short distance from each fluid motor 52, on each side thereof. Each locating cam 60 may take the form of a piece of plate steel cut to include a slot for receiving an outer portion of the base flange 48, and a sloping inner surface 62 which functions as an inclined plane to cam the outer mold part 12 into a proper seated position, wherein it is properly spaced relative to the inner mold part 10. A spacer plate 49 extends all the way around, and is secured atop, the base flange 48. The horizontal spacing of the lowermost portions of the cam surfaces 62 outwardly from the outer edge of plate 49 is slightly greater than the thickness of the lower side wall portions of the outer mold part 12. Thus, when the outer mold part 12 is in place the lower edges of its side wall rest on the portion of the base flange 48 which surroundingly borders the outer vertical edge surface of plate 49.

The outer mold part 12 also includes four side walls or panels 64, 66, 68, 70 interconnected by four corner walls or panels 72, 74, 76, 78. Each of these walls or panels also lean inwardly a slight amount from vertical so as to give the inner space of the outer mold part 12 a slightly upwardly tapering form and a breakaway angle so that it can be readily separated from the molded article.

Preferably, the outer mold part 12 is suitably reinforced, such as by a plurality of girth ribs 80, 82, 84, 86 which may be fabricated from sections of angle iron welded together and to and about the mold part 12, in the manner illustrated.

According to the present invention, a lever assembly LA is provided on each of at least two opposite side walls of the outer mold part 12. In the illustrated embodiment, the level assemblies LA are associated with side wall 66, 70.

Figure 3:
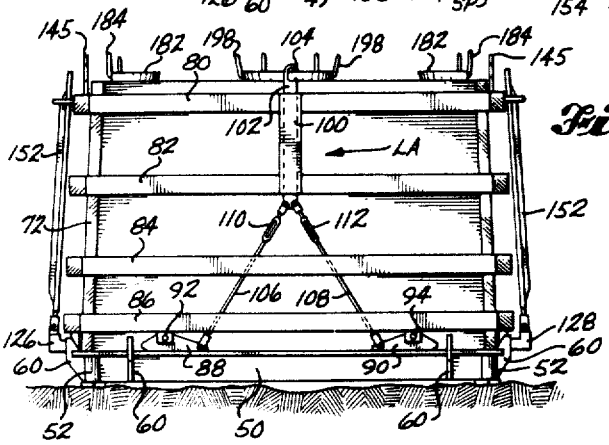
FIG. 3 is a side elevational view of the assembled apparatus, showing one of two side placed lever assemblies constituting one form of means for exerting a separating force between the inner and outer mold parts.
Figure 4:
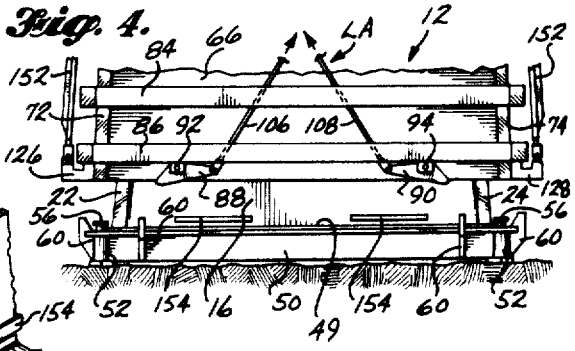
FIG. 4 is a fragmentary side elevational view showing the lower portion of the outer mold part raised a short distance above its assembled position on the peripheral base flange portion of the inner mold part, and showing the levers partially rocked downwardly.

Referring to FIGS. 1, 3 and 4, in particular, each lever assembly LA is shown to comprise a pair of levers 88, 90 spaced apart near the lower edge of the side wall. The levers 88, 90 are pivotally connected at points intermediate their ends to lower portions of the side wall. The pivot pin means 92, 94 divides the levers 88, 90 into inner and outer end portions.

An operator and a guide means therefor are located between and above the pair of the levers 88, 90. The guide means may consist of a pair of aligned openings 96, 98 formed in the horizontal portions of the girth ribs 80, 82. A vertical reinforcing strap 100 may be rigidly interconnected between outer portions of the girth ribs 80, 82 in the region of the guide openings 96, 98. The operator may consist of a flat bar 102 having a hook 104 or some other suitable coupling means at the upper end thereof. The lower end portion of the operator 102 is connected to the inner end portions of its pair of levers 88, 90 by tension means, shown in the form of rods 106, 108 provided with turnbuckles 110, 112, so as to render the rods 106, 108 adjustable. Openings 114, 116 are formed in the top portion of girth rib 84, and a similar set of openings 118, 120 are provided in the top portion of girth rib 86. The rod 106 extends through openings 114, 118 and rod 108 extends through openings 116, 120.

The levers 88, 90 are located below the upper portion of girth rib 86. When the operators 102 are lifted upon, such as by means of a lifting beam LB having end portions 122, 124 which engage the hooks 104, the operators 102 initially move upwardly and pull the tension members 106, 108 upwardly with them. The tension members 106, 108 swing upwardly the inner end portions of the levers 88, 90. As shown by FIG. 4, this causes the outer end portions of the levers 88, 90 to swing downwardly below the lower level of the related side wall 66 or 70. Since the lower edge surfaces of the walls 66, 70 normally rest on the upper surfaces of the base flange 88 when the two mold parts 10, 12 are assembled, any downward movement of the outer end portions of the levers 88, 90 moves such end portions hard against the base flange 48, and exerts a lifting force on the outer mold part 12, tending to displace it upwardly relative to the inner mold part 10.

The upper portion of lower girth rib 86 may be used as a stop to limit the amount of movement of the levers 88, 90, or such levers may be permitted to move until the pivotal connections between the lower end portions of the tension rods 106, 108 and the inner end portions of the levers 88, 90 are aligned with the axes of the rods 106, 108 and with the pivot points 92, 94. Once the levers 88, 90 have been swung upwardly into their limit positions, the operators 102 will no longer move relative to the outer mold part 12, and an additional lifting force applied on the operators results in the entire upper mold part 12 being lifted upwardly.

According to the present invention, the outer mold part 12 is provided with means for locking the molded article to it so that when the outer mold part 12 is lifted the molded article will also be lifted and become separated from the inner mold part 10. Preferably, the locking means comprises a lever member 126, 128 pivotally connected to lower portions of the intermediate side walls 64, 68.

Figure 6:
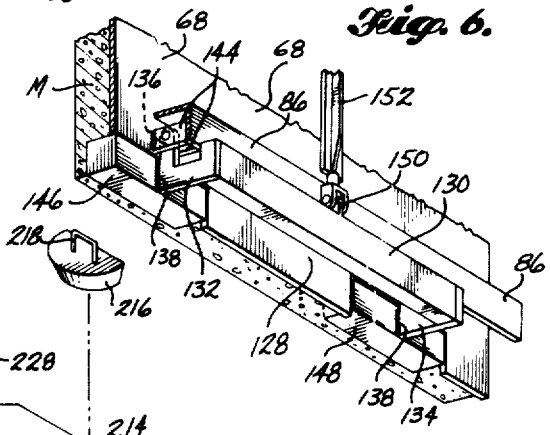
FIG. 6 is a fragmentary perspective view of one of the lock mechanisms, taken from below and looking toward the bottom and one side of the lock mechanism.

As shown by FIG. 6, directed to lever assembly 128 but showing the constructional details of both, each lever assembly 126, 128 may comprise an outer portion 130, shown in the form of a length of channel iron. Identical end pieces 132, 134 are secured to the ends of the channel iron 130. Such end portions 132, 134 include an upstanding hinge portion 136 and an inner edge portion 138. At each end of the lever assembly a short length of bar iron 140, 142 is welded at a location intermediate its ends to the inner edge 138, of the piece 132 or 134. As shown by FIG. 6, parallel, spaced apart bars 144 are interconnected between the side wall 68 and the vertical panel of the girth rib 86, to provide a space therebetween for the reception of the upstanding hinge portion 136 of the end members 132, 134. A pivot pin extends through aligned openings in the two members 144 and the hinge portion 136, and serves to pivotally connect the lever assembly 128 (or 126) to the upper mold part 12. The sections of bar iron 140, 142 are oriented relative to the end members 132, 134 in such a way that when the outer portion 130 of the lever assembly is swung down into its lowermost position the outer vertical surface of each angle member 140, 142 is substantially in coplanar parallelism with the outer surface of the side wall 68, and the major portion of the bar iron 140, 142 projects inwardly, partially into the mold cavity and constitutes an obstacle in the removal path of any molded article M within the mold cavity. The lower portion of the side wall 68 is cut away in the vicinity of the bar iron members 140, 142, so that when in their substantially horizontal positions the lower sides 146, 148 of the bar iron members 140, 142 are spaced above the lower edge of the undisturbed portion of side wall 68 an amount substantially equal to the depth of member 49.

An upstanding lug 150 may be provided on the channel member 130 at a location near its center, and the lower end portion of a rigid operator 152 is pivotally attached to such lug 150. Preferably, the operators 152 extend upwardly a short distance above the upper edges of the side wall 64, 68, and terminate in an apertured end portion, a hook, or a similar type of connector element which is attachable to one of the ends 153' of the lifting beam LB. Then operators 152 are initially locked or secured to the outer mold part 12. This may be done by providing the upper girth rib 80 with a stud 149 to one side of a vertical orientation of the operator 152, insertable through an opening provided in an upper portion of the operator 152. The stud 149 may be provided with a transverse opening for receiving a nail or similar type of headed locking pin.

When it is desired to strip or separate the outer mold part from the mold article M, the locking nail or pin is removed, the apertures 151 in the operators 152 are aligned with the inner spaces of the hooks 145, and the ends 153' of the lifting beam LB are inserted into the apertures 151. Initial upward movement of the operators 152 by the lifting beam LB applies an upward force on the lever assemblies 126, 128 at the points 150, resulting in the outer portions of the lever members 128, 130 being swung upwardly and the inner portions 140, 148 thereof being swung downwardly. The inner spaces of the hooks 145 are sufficiently deep that the channel beams 130 will not contact, and in that manner have their movement arrested by, the girth rib 186, and the holding bars 140, 142 will have been moved entirely out from the removal path of the molded article M, by the time the end portions 153 of the beam LB contact the upper portions of the hooks 145.

Once movement of the lever members 126, 128 and the operators 152 relative to the outer mold part 12 is arrested by the hooks 145, the lever members 126, 128 and the operators 152 in effect become inactive, and the lifting beam LB is operably connected to the hooks 145. Thus, any additional lifting force applied on the lifting beam LB will be transmitted to the outer mold part 12 by the hooks 145, and it will be lifted upwardly free of the molded article M.

While the lever assemblies LA and the fluid motors 52 are shown combined together in the same assembly, and are in fact usable together, it is to be understood that a given mold apparatus may include one such separating force producing means but not the other. For example, in a plant installation involving a plurality of mold apparatuses set side-by-side, it would be particularly advantageous to provide such assemblies with fluid motors 52 for applying a separating force between the two mold parts 10, 12. In such an installation it might be desirable to position a locking mechanism of the type illustrated at each of the four sides of the outer mold part 12. In a field installation, or in a relatively small plant, it may not be economically feasible to use fluid motors. In such installations the lever assemblies LA can be utilized as a sole means for applying a separating force between the two mold parts 10, 12. It is also possible to position a locking mechanism at each of the four sides in an installation of this type, with the locking levers 126, 128 on the same sides as the lever assemblies positioned between the lever arms 92, 94.

Figure 2:
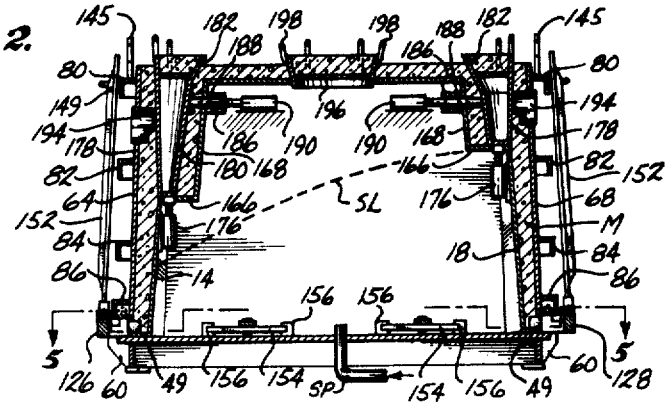
FIG. 2 is a longitudinal sectional view of the casting apparatus of FIG. 1, assembled and including concrete hardening in the mold cavity, the section being taken substantially along line 2—2 of FIG. 5.

As best shown by FIG. 2, the wall means of the outer mold part 12 projects upwardly several inches above the level of the top panel 30 of the inner mold part 10. This extends the mold cavity into the region above such top panel 30. Thus, the mold cavity formed by and between the inner and outer mold parts 10, 12 is adapted to form an article M having a top and side walls all around, but no bottom.

The apparatus described so far has general utility and may be used for rapidly and economically forming many types of hollow articles, such as septic tanks, burial vaults, manhole boxes, etc. The features which will now be described may have some general utility, but relate particularly to the construction of an improved type of septic tank which is itself an aspect of the invention.

According to the invention, the inner mold part 10 includes means for forming voids or cavities in the lower inner edge portions of the molded article M. Such means may comprise horizontal void forming members 154 mounted for reciprocal movement between extended positions, wherein they are located partly within the mold cavity, to withdrawn positions, wherein they are located substantially entirely within the inner space of the inner mold part 10. The void forming members 154 may be supported and guided by side guide means 156, shown in the form of a pair of inwardly opening channels in opposed parallelism.

Figure 5:
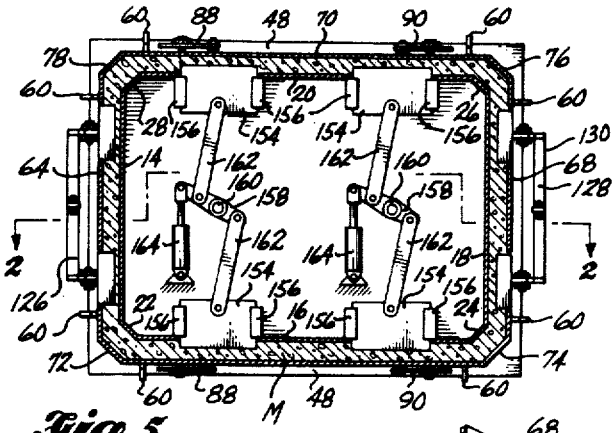
FIG. 5 is a transverse sectional view taken through the assembly of FIG. 2, substantially along line 5—5 of FIG. 2, showing in plan a typical embodiment of mechanism for creating voids in the lower inner wall portions of the article being cast, for later receiving portions of the concrete used to form the bottom, and showing in plan a typical embodiment of releasible lock means carried by the outer mold part, and serving to lock the molded article to the outer mold part.

A single mechanism may be provided for operating each pair of opposed void forming members 154. Typically, the operating mechanism may comprise a pivoting link 158 pivotally connected at a point intermediate its ends to a portion (not shown) of the inner mold part 10, by a vertical pivot pin 160. A pair of identical links 162 may be pivotally connected at their inner ends to points on the lever 158 which are spaced equal distance outwardly from, and on opposite sides of, the pin 160, and are pivotally connected at their outer ends to the void forming plates 154, in the manner illustrated by FIG. 5. One end portion of each lever 158 may be extended and attached to one end of a fluid motor 164, so that extension of the fluid motor swings the lever 158 in a direction whereby it pushes the links 162 and the void forming elements 154 connected thereto outwardly, and retraction thereof pushes the lever 158, the links 162, and the void forming members 154 inwardly.

In use, the void forming members 154 are extended outwardly into positions partially within the mold cavity, and are maintained in such position until it is desired to separate the molded product M from the inner mold part 10. At such time the fluid motors 164 are retracted so as to in turn retract the void forming plates 154. At a later time, following complete removal of the bottomless molded article M from both mold parts 10, 12, concrete is poured into the article to form a bottom therefor. A portion of this concrete flows into the voids formed by the plates 154, and functions to lock or key the bottom to the remainder of the molded article. The formation of the bottom is hereinafter described in greater detail.

Figure 8:
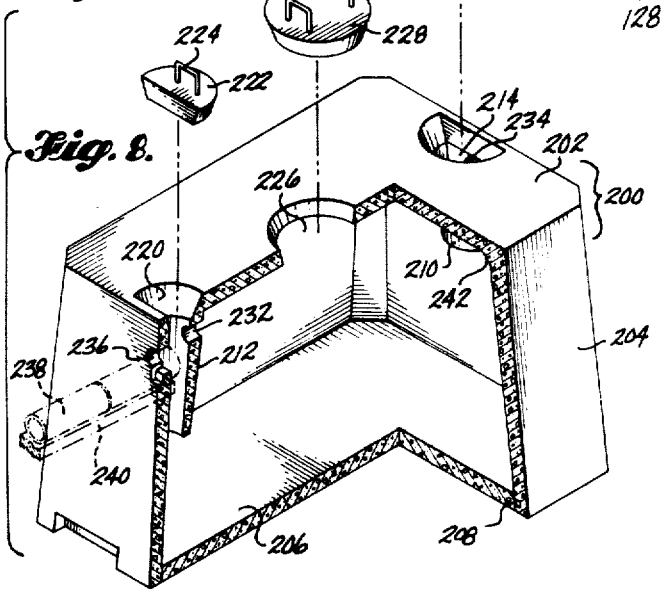
FIG. 8 is a perspective view of the septic tank characteristic of the invention, with a foreground portion thereof cut away for clarity of illustration of its physical makeup.
Figure 10:
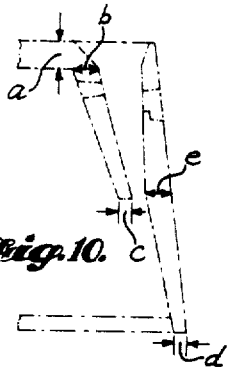
FIG. 10 is a fragmentary longitudinal sectional view of a septic tank constructed according to the present invention, showing the gradual thickening of all walls from bottom to top of the tank.

For constructing a septic tank of the type shown by FIGS. 8 and 10, the inner mold part 10 is formed to include recesses in the central upper portion of each of its two opposite side walls 14, 18. As shown by FIG. 1, each recess comprises a generally flat bottom 166 and a concave side wall 168 of downwardly tapering form. An opening 170, preferably of a square or some other noncircular shape, is provided in the bottom 166. Such opening 170 may serve two purposes. Firstly, it may receive a locating pin or lug 172 provided at the lower end of a baffle core member 174, hereinafter to be described in detail. Secondly, a fluid motor 176 is mounted inside the inner mold part 10 below the bottom 166 of each recess, and the opening 170 serves as an avenue through which the head of the piston portion of the motor 176 may extend during its upward travel into the recess. In FIG. 2 the fluid motors 166 are shown with their pistons retracted. When extended, such pistons will travel upwardly through openings 176, will contact the pins 172, and will force the baffle core members 174 upwardly. The fluid motors 176 are provided for forcing the baffle core members 174 upwardly and out from the recess when it is time to remove the molded article M from the molding apparatus.

Each baffle core member 174 is, like its recess, of downwardly tapering form. Each baffle core member 174 includes a substantially flat outer wall portion 178, a convex inner wall portion 180, and a pan-like upper portion 182. As clearly shown by FIG. 2, when a baffle core member 174 is in place within its recess, its lower end makes contact with the bottom 166 of the recess. This means that no space exists below the baffle core member 174 and the bottom of the recess, and the molded article will include no material at such location. As a result, the molded article will have an opening in the region below the space vacated by the baffle core member 174. The substantially flat outer wall 178 of the baffle core member 174 is substantially coplanar with the side wall 14 or 18 at its end of the form. The side edges of wall means 178 are spaced inwardly from the side edges of the recess, and the curved inner wall means 180 is spaced outwardly about the same distance from the curved inner wall 168 of the recess. Consequently, the mold cavity extends into the recess and about the baffle core member 174, and in the regions of the baffle core members 174 has a downwardly tapering D-sectional shape.

As shown by FIG. 2, the pan-like upper portion 182 of each baffle core member 174 projects through and slightly above the top region of the mold cavity. It performs two functions. Firstly, it forms a downwardly tapering opening through the top of the molded article M, leading into the baffles. Secondly, some of the concrete, or other plastic or liquid substance, is poured into the interior of the pan, and constitutes a downwardly tapering plug or closure member for the opening. Each baffle member 174 may be provided with a handle means 184 at its upper end for convenience in handling.

An opening or passageway 184 may be provided through the upper central portion of each recess wall 168, to serve as an avenue for a tapered passageway forming member 188 having an extended position in which it spans across the space defined by and between the curved wall 180 of the baffle core member 174 and the curved wall 168 of the recess, and a retracted position in which it is located partially in said passageway and partially with the inner mold part 10. A fluid motor 170, located inside the inner mold part 10, may be provided for reciprocating the passageway forming member 188.

A generally keyhole shaped opening 192 is formed in each side wall 64, 68 of the outer mold part 12 somewhat opposite the position of the passageway forming members 188. Each such keyhole opening 192 receives a generally keyhole shaped insert 194 of complementary size and shape, which in its circular upper portion is long enough to span entirely across the mold cavity in the region of the keyhole openings 192. The inserts 194 are used to form inlet and outlet passageways, respectively, for the vertical baffles formed at opposite sides of the molded septic tank M, one of which is an inlet baffle and the other of which is an outlet baffle.

Referring further to FIG. 2, an opening is formed in the center portion of the top panel 30 of the inner mold part 10. A downwardly tapering pan 196 is adapted to fit into the opening 195. The pan 196, like the upper portions 184 of the baffle core members 174, performs a dual function. Firstly, it forms a downwardly tapering opening in the top of the molded article M. Secondly, its upper interior portion serves as a mold for a plug or closure member for such opening. The pan 196 may be provided for handles 198, as illustrated.

Referring now to FIG. 8, the septic tank formed according to the present invention comprises a major part or section 200 which is a one piece, integral casting, and consists of a top 200 and side wall means 204. The major section 200 is complemented by a minor part of section 206, consisting only of the bottom 206. The bottom 206 includes a tongue for each void formed by the void forming plates 154. One of the tongues is partly shown in FIG. 8, and is designated 208. Since the bottom 206 is poured after the major section 200 is substantially set and the voids therein have formed, such voids in effect become molds for the tongues 208.

The septic tank M has an inlet baffle 210 on one side thereof and an outlet baffle 212 on its opposed side. As best shown by FIG. 2, the bottom of the inlet baffle 210 is spaced above the bottom of the outlet baffle 212. This is because the sludge which settles in the bottom of the tank settles at a slope, indicated by the broken line SL in FIG. 2.

A top opening 214 in inlet baffle 210 is closed by a plug 216, formed in the upper pan portion 182 of the core 174 which forms the inlet baffle 210. The plug 216 may include a handle 218. In like fashion, outlet baffle 212 includes an access opening 220 in the top of the tank and a plug 222 therefor, which includes a handle 224. The opening 226 formed by the center pan 196 is normally closed by a plug 228 which is formed in the upper hollow portion of the pan 196, in the manner described above. Plug 228 may include handles 230.

Each baffle 210, 212 includes a horizontal vent opening in the upper portion of its inner wall. The vent opening for the outlet bace 212 is designated 232, and the vent opening for the inlet baffle 210 is similarly placed, as indicated by the position of its forming member 188 in FIG. 2.

The inlet opening 234 leading through an outer side wall portion of the tank into the inlet baffle 210, and the outlet opening 236 leading out from the outlet baffle 212 through the outer sidewall portion of the tank are both of keyhole shape on the outside and of a circular shape on the inside. The upper tapering circular portion of the keyhole opening 234 communicates with a pipe or conduit (not shown) leading into the tank, and the upper tapering circular portion of the keyhole opening 236 communicates with the soil pipe or conduit 238 (shown by phantom lines) leading away from the tank. The rectangular outer lower portions of the keyhole openings 234, 236 receive end portions of beams (e.g. lengths of 2×4 inch material) which lie below and support the pipe and are long enough to span from the tank to unexcavated ground. These beams 240 support the pipe so that upon any settling of the tank the pipe will uniformly settle with it, rather than jackknifing and/or breaking at a point intermediate its ends.

Figure 9:
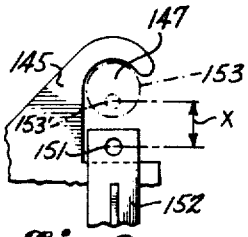
FIG. 9 is a fragmentary elevational view looking towards the end hooks secured to the outer mold part and the upper end portion of the related operator for the locking means of such end of the outer mold part.

The septic tank as a whole widens from its top 202 down to its base or bottom 206. Also, each vertical wall becomes thicker from its bottom to its top. These features, together with the chamfered corner construction of the tank and the strengthening fillet 242 which extends completely around the interior of the tank, where the top 202 is joined to the side wall means 204, provides the tank with superior strength, enabling it to be placed beneath driveways or patios, where conventional tanks ordinarily cannot be placed. Referring to FIG. 9, by way of typical and therefore nonlimitative example, the outlet wall may be about 2½" thick at d and about 3" thick at e. The baffle inner wall may be about 2¼" thick at c and about 3½" thick at b. The top may be about 5" thick at a. It will be noted that the slope of the inner surface of the inner wall of each baffle is greater than the slope of the inner surface of the end walls of the tank. This is so the baffles, which are relatively delicate, will break loose first when the assembly is lifted.

The technique of the present invention will now be described. Initially, the outer mold part 12 is set in place over the inner mold part 10. This may be done by picking the outer mold part 12 up by use of the lifting device LD and the lifting beams LB, and then lowering it down and over the upstanding body portion of the lower mold part 10. The locating cams 60 will serve to seat the outer mold part 12 into a proper position or spacing relative to the inner mold part 10. The baffle core members 174, the center pan 196 and the keyhole inserts 194 are then set in place. Also, the passageway forming members 188 and the void forming plates 154 are extended. Then a slurry of Portland cement type concrete, or some other liquid or plastic substance which will set into a solid, is introduced into the mold cavity formed by and between the respective wall means of the inner and outer mold parts 10, 12 and the baffle members 174, and some is also introduced into the plug forming pans 182, 196. After the concrete has set for a few hours and is sufficiently solid, and the septic tank has taken a definite form, the void forming plates 154 and the passageway forming members 188 are retracted. Then, the baffle core members 174, the keyhole inserts 194, and the center pan 196 are removed. The lifting beam LB is then lowered and its end portions 122, 124 are set in place within the jaws of the hooks 104. The lifting device LD is then employed to lift upwardly on the upper mold part 12, and the septic tank M locked thereto (by means of the locking levers 126, 128). The corner located fluid motors 52 may be extended at the same time. As earlier explained, the initial lifting force moves the actuators 102 upwardly, causing the outer end portions of the separating levers 88, 90 to rock downwardly and impose a positive separating force on the base flange 48, tending to move the upper mold part 12 and the molded particle locked thereto upwardly relative to the inner mold part 10. This is immediately followed by a lifting force on the upper mold part 12 and the mold product, as an assembly, and such lifting force is used to raise such assembly upwardly and completely free of the inner mold part 10.

Preferably, the lifting device LD includes a boom carried by some sort of transporter vehicle. Such vehicle is used to move the raised assembly away from the site of the inner mold part 10, to a new site whereat it is set down, preferably upon a bed of small gravel. The lifting beam LB is then used to raise the actuators 152 of the rocking levers 126, 128. As earlier explained, an upward movement of the actuators 152 causes the locking levers 126, 128 to pivot in a manner removing the retaining or locking lips 186 out from positions of engagement with the lower edges of the molded product, and completely out of the removal path of the molded product from the outer mold part 12. The lifting device is then used once again to lift the outer mold part 12 upwardly and completely free of the molded product, and to return it to the site of the inner mold part 10 for reassembly therewith.

The concrete or other substance for forming the bottom 206 of the septic tank is introduced into the interior of the tank by way of the center opening 226. As earlier explained, some of the concrete or other substance for the bottom 206 flows into the voids formed by the plates 154, and forms the tongues 208 which lock or key the bottom 206 to the remaining or major portion 200 of the septic tank.

Although the technique of the present invention has been described in connection with the manufacture of the septic tank product shown by FIG. 8 of the drawing, it is to be understood that such technique, and many features of the molding apparatus, are usable for rapidly and economically forming many other types of hollow molded articles. Also, according to the invention, the concrete or other substance may be made to set more rapidly by heating the molding apparatus to in turn heat the concrete or other substance. This may be done by steam heating the interior of the inner mold part, such as by introducing steam into the inner mold part via a bottom located steam pipe SP. It is also to be known that the invention is not to be limited to the constructional details shown and described, nor to the specific technique steps which are described, but that various changes and modifications may be made without departing from the spirit and scope of the invention, and the invention is to be limited only by the appended claims.

What is claimed is:

[1. A method of casting a septic tank comprising:

locating an inner mold part having a top and side wall means at a pouring site;

inserting over said inner mold part an outer mold part having side wall means which when the two mold parts are assembled is spaced laterally outwardly from the side wall means of the inner mold part and also projects upwardly above the top of the inner mold part;

introducing a plastic or fluid substance of a type which sets into a solid into the space between the respective side wall means of the two mold parts and into the space above the top of the inner mold part which is bounded by the upwardly projecting portion of the side wall means of the outer mold part, so as to cast together integral tank top and side wall means;

forming at least one opening in the top of such tank;

allowing said substance to set up at least until the top and side walls of said tank are self-supporting;

applying a separating force between the inner and outer mold parts, and at the same time applying a lifting force on the outer mold part and the tank therein, as an assembly, so as to separate such assembly from the inner part;

lifting said assembly upwardly completely free of said inner mold part;

setting said assembly down on a supporting surface;

lifting upwardly on the outer mold part alone, to cause its separation from the tank;

lifting said outer mold part upwardly and completely free of said tank and removing it from the site of said tank;

introducing an additional amount of said substance through said access opening and into said tank, and depositing such substance on said supporting surface, in the area between the tank side wall means, so as to form a bottom for said tank;

firmly connecting said bottom to the lower peripheral portion of said tank side wall means while forming said bottom; and lifting the completed tank, including the bottom free of said supporting surface following sufficient hardening of the bottom connection of the bottom to the side wall means.]

2. A method [according to claim 1,] *of casting a septic tank comprising:*

*locating an inner mold part having a top and side wall means at a pouring site;*

*inserting over said inner mold part an outer mold part having side wall means which when the two mold parts are assembled is spaced laterally outwardly from the side wall means of the inner mold part and also projects upwardly above the top of the inner mold part;*

*introducing a plastic or fluid substance of a type which sets into a solid into the space between the respective side wall means of the two mold parts and into the space above the top of the inner part which is bounded by the upwardly projecting portion of the side wall means of the outer mold part, so as to cast together integral tank top and side wall means;*

*forming at least one opening in the top of said tank;*

*allowing said substance to set up at least until the top and side walls of said tank are self-supporting;*

*applying a separating force between the inner and outer mold parts, and at the same time applying a lifting force on the outer mold part and the tank therein, as an assembly, so as to separate such assembly from the inner part;*

*lifting said assembly upwardly completely free of said inner mold part;*

*setting said assembly down on a supporting surface;*

*lifting upwardly on the outer mold part alone, to cause its separation from the tank;*

*lifting said outer mold part upwardly and completely free of said tank and removing it from the site of said tank;*

*introducing an additional amount of said substance through said access opening and into said tank, and depositing such substance on said supporting surface, in the area between the tank side wall means, so as to form a bottom for said tank;*

*firmly connecting said bottom to the lower peripheral portion of said tank side wall means while forming said bottom;*

*lifting the completed tank, including the bottom free of said supporting surface following sufficient hardening of the bottom and connection of the bottom to the side wall means; and* further comprising providing the inner mold part with a base for supporting the lower edge of the outer mold part, pivotally mounting lever arms on the side wall means of the outer mold part, with a first portion of each lever arm located on one side of the pivotal axis and a second portion thereof on the opposite side of such axis, and applying said separating force between the inner and outer mold parts by lifting upwardly on one of said portions of each [level] *lever* arm so as to cause the opposite portion of the lever arm to swing downwardly into a force applying contact against said base.

3. A method according to claim 2, further comprising using an overhead lifting device for exerting an upward force on said lever arms and for lifting the outer mold part and the tank therein upwardly through its connection with the lever arms.

[4. A method according to claim 1, further comprising pivotally mounting at least one holding implement for the tank onto the outer mold part, for pivotal movement between a position of interference with removal of the tank from the outer mold part and a position of noninterference with removal of the tank from the outer mold part, initially locking said implement in its tank removal interfering position and maintaining it in said position during both casting of the tank and moving of the outer mold part and tank as an assembly, and then unlocking said implement and moving it into its position of noninterference with removal of the tank from the outer mold part at a time prior to separation of the outer mold part from the tank.]

[5. A method according to claim 4, comprising using an overhead lifting force for moving the implement from its interfering position into its noninterfering position, and continuing to apply the upwardly lifting force on the implement after it is in its position of noninterference for lifting the outer mold part upwardly alone through its connection with said implement.]

6. A method according to claim [1] *10*, comprising introducing steam into the inner part for the purpose of heating the plastic or fluid substance as it is setting.

7. A method [according to claim 1,] *of casting a septic tank comprising:*

*locating an inner mold part having a top and side wall means at a pouring site;*

*inserting over said inner mold part an outer mold part having side wall means which when the two mold parts are assembled is spaced laterally outwardly from the side wall means of the inner mold part and also projects upwardly above the top of the inner mold part;*

*introducing a plastic or fluid substance of a type which sets into a solid into the space between the respective side wall means of the two mold parts and into the space above the top of the inner mold part which is bounded by the upwardly projecting portion of the side wall means of the outer mold part, so as to cast together integral tank top and side wall means;*

*forming at least one opening in the top of said tank;*

*allowing said substance to set up at least until the top and side walls of said tank are self-supporting;*

*applying a separating force between the inner and outer mold parts, and at the same time applying a lifting force on the outer mold part and the tank therein, as an assembly, so as to separate such assembly from the inner part;*

*lifting said assembly upwardly completely free of said inner mold part;*

*setting said assembly down on a supporting surface; lifting upwardly on the outer mold part alone, to cause its separation from the tank;*

*lifting said outer mold part upwardly and completely free of said tank and removing it from the site of said tank;*

*introducing an additional amount of said substance through said access opening and into said tank, and depositing such substance on said supporting surface,*

*in the area between the tank side wall means, so as to form a bottom for said tank;*

*firmly connecting said bottom to the lower peripheral portion of said tank side wall means while forming said bottom;*

*lifting the completed tank, including the bottom free of said supporting surface following sufficient hardening of the bottom and connection of the bottom to the side wall means; and* further comprising during casting of the tank top and side wall means forming a plurality of voids in the lower inner wall portions of said tank, at locations spaced about said tank, and during formation of the bottom for the tank introducing some of the substance used for the bottom into said voids, so as to key the bottom to the lower wall portion of the tank.

8. A method according to claim 7, comprising forming the voids by projecting elements from within the inner mold part outwardly through openings in the side wall means of the inner mold part and into the wall space formed between the respective side wall means of the two mold parts, and withdrawing such elements into the interior of the inner mold part after casting of the tank top and side wall means and prior to exerting the upward force on the outer mold part for the purpose of lifting it and the tank as an assembly free from the inner mold part.

9. A method according to claim [1] *10,* further comprising employing an inner mold part which includes substantially opposed recesses in the side wall means thereof, which recesses extend downwardly from the top of said inner mold a substantial distance but less than the full height of said side wall means; inserting a filler body into each recess following assembly of said inner and outer mold parts, which filler bodies are each smaller in cross-sectional dimension than their respective recesses, so that a space exists all around said filler bodies, and are of a height to extend upwardly substantially above the top of the inner mold part so that their upper ends are above the level of the tank top; during formation of the top and sied wall means of said tank introducing some of the plastic or fluid substance into the spaces surrounding the filler bodies; and following setup of said substance removing said filler bodies.

*10. A method of upright casting of a full height septic tank, comprising:*

*locating an inner mold part having a top and upwardly tapering side wall means at a pouring site;*

*inserting over said inner mold part an outer mold part having upwardly tapering side wall means which when the two mold parts are assembled is spaced laterally outwardly from the side wall means of the inner mold part and also projects upwardly above the top of the inner mold part;*

*introducing a plastic or fluid substance of a type which sets into a solid into the space between the respective side wall means of the two mold parts and into the space above the top of the inner mold part which is bounded by the upwardly projecting portion of the side wall means of the outer mold part, so as to cast together integral tank top and side wall means;*

*forming at least one opening in the top of said tank;*

*establishing bottom keying components in the lower portions of the tank side walls while forming the tank top and side wall means;*

*allowing said substance to set up at least until the top and side walls of said tank are self-supporting;*

*applying a separating force between the inner and outer mold parts, and at the same time applying a lifting force on the outer mold part and the tank therein, as an assembly, so as to separate such assembly from the inner part;*

*lifting said assembly upwardly completely free of said inner mold part;*

*setting said assembly down on a supporting surface in a curing site spaced from the pouring site;*

*lifting upwardly on the outer mold part alone, to cause its separation from the tank;*

*lifting said outer mold part upwardly and completely free of said tank and removing it from the site of said tank;*

*returning said outer mold part to the pouring site, for reinsertion over an inner mold part;*

*introducing an additional amount of said substance through said access opening and into said tank, and depositing such substance on said supporting surface, in the area between the tank side wall means, so as to form a bottom for said tank;*

*firmly connecting said bottom to the lower peripheral portion of said tank side wall means while forming said bottom, including using said keying components for mechanically keying the bottom to the tank side wall means;*

*lifting the completed tank, including the bottom free of said supporting surface following sufficient hardening of the bottom and connection of the bottom to the side wall means.*

*11. A method according to claim 10, further including casting into the tank side wall means a fillet inside the tank which extends between the tank top and the tank side wall means.*

*12. A method according to claim 10, comprising applying the separating and lifting forces by means including a plurality of fluid motors.*

*13. A method according to claim 10, further comprising introducing a heated fluid into the interior of the inner mold part for the purpose of providing heat for accelerating set of the plastic or fluid substance.*

*14. A method according to claim 7, wherein the inner mold part includes upwardly tapering side wall means and the outer mold part includes upwardly tapering side wall means, resulting in a septic tank which tapers upwardly both on the inside and the outside.*

*15. A method according to claim 14, further including casting into the tank side wall means a fillet inside the tank which extends between the tank top and the tank side wall means.*

*16. A method according to claim 7, comprising applying the separating and lifting forces by means including a plurality of fluid motors.*

*17. A method according to claim 14, comprising applying the separating and lifting forces by means including a plurality of fluid motors.*

*18. A method according to claim 17, further comprising introducing a heated fluid to the interior of the inner mold part for the purpose of providing heat for accelerating set of the plastic or fluid substance.*

*19. A method of upright casting of a full height septic tank, comprising:*

*locating an inner mold part having a top and upwardly tapering side wall means at a pouring site;*

*inserting over said inner mold part an outer mold part having upwardly tapering side wall means which when the two mold parts are assembled is spaced laterally outwardly from the side wall means of the inner mold*

*part and also projects upwardly above the top of the inner mold part;*

*introducing a plastic or fluid substance of a type which sets into a solid into the space between the respective side wall means of the two mold parts and into the space above the top of the inner mold part which is bounded by the upwardly projecting portion of the side wall means of the outer mold part, so as to cast together integral tank top and side walls means;*

*forming at least one opening in the top of said tank;*

*allowing said substance to set up at least until the top and side walls of said tank are self-supporting;*

*applying a separating force between the inner and outer mold parts, and at the same time applying a lifting force on the outer mold part and the tank therein, as an assembly, so as to separate such assembly from the inner part;*

*lifting said assembly upwardly completely free of said inner mold part;*

*setting said assembly down on a supporting surface in a curing site spaced from the pouring site;*

*lifting upwardly on the outer mold part alone, to cause its separation from the tank;*

*lifting said outer mold part upwardly and completely free of said tank and removing it from the site of said tank;*

*returning said outer mold part to the pouring site, for reinsertion over an inner mold part;*

*introducing an additional amount of said substance through said access opening and into said tank, and depositing such substance on said supporting surface, in the area between the tank side wall means, so as to form a bottom for said tank;*

*firmly connecting said bottom to the lower peripheral portion of said tank side wall means while forming said bottom, including mechanically keying the bottom to the tank side walls means;*

*lifting the completed tank, including the bottom free of said supporting surface following sufficient hardening of the bottom and connection of the bottom to the side wall means.*

*20. A method according to claim 19, further including casting into the tank side wall means a fillet inside the tank which extends between the tank top and the tank side wall means.*

*21. A method of casting a septic tank comprising:*

*locating an inner mold part having a top and side wall means at a pouring site;*

*inserting over said inner mold part an outer mold part having side wall means which when the two mold parts are assembled is spaced laterally outwardly from the side wall means of the inner mold part and also projects upwardly above the top of the inner mold part;*

*introducing a plastic or fluid substance of a type which sets into a solid into the space between the respective side wall means of the two mold parts and into the space above the top of the inner mold part which is bounded by the upwardly projecting portion of the side wall means of the outer mold part, so as cast together integral tank top and side wall means;*

*forming at least one opening in the top of said tank;*

*allowing said substance to set up at least until the top and side walls of said tank are self-supporting;*

*applying a separating force between the inner and outer mold parts, and at the same time applying a lifting force on the outer mold part and the tank therein, as an assembly, so as to separate such assembly from the inner part;*

*lifting said assembly upwardly completely free of said inner mold part;*

*setting said assembly down on a supporting surface;*

*lifting upwardly on the outer mold part alone, to cause its separating from the tank;*

*lifting said outer mold part upwardly and completely free of said tank and removing it from the site of said tank;*

*introducing an additional amount of said substance through said access opening and into said tank, and depositing such substance on said supporting surface, in the area between the tank side wall means, so as to form a bottom for said tank;*

*firmly connecting said bottom to the lower peripheral portion of said tank side wall means while forming said bottom;*

*lifting the completed tank, including the bottom free of said supporting surface following sufficient hardening of the bottom and connection of the bottom to the side wall means;*

*pivotally mounting at least one holding implement for the tank onto the outer mold part, for pivotal movement between a position of interference with removal of the tank from the outer mold part and a position of noninterference with removal of the tank from the outermold part, initially locking said implement in its tank removal interfering position and maintaining it in said position during both casting of the tank and moving of the outer mold part and and tank as an assembly, and then unlocking said implement and moving it into its position of noninterference with removal of the tank from the outer mold part from the tank, and further comprising using an overhead lifting force for moving the implement from its interfering position into its noninterfering position, and continuing to apply the upwardly lifting force on the implement after it is in its position of noninterference for lifting the outer mold part upwardly alone through its connection with said implement.*

* * * * *

UNITED STATES PATENT AND TRADEMARK OFFICE

CERTIFICATE OF CORRECTION

PATENT NO. : Re 31, 753

DATED : December 4, 1984

INVENTOR(S) : Joseph M. LaVergne, Jr.

It is certified that error appears in the above-identified patent and that said Letters Patent is hereby corrected as shown below:

Column 1, line 17, "Green" should be --Greene--.

Column 1, line 26, "Green" should be --Greene--.

Column 1, line 60, "perspecitve" should be --perspective--.

Column 8, line 19, "of" should be --or--.

Column 8, line 46, "bace" should be --baffle--.

Claim 1, column 10, line 56, "such" should be --said--.

Claim 2, column 11, line 28, after "inner" insert --mold--.

Claim 9, column 13, line 41, "sied" should be --said--.

Signed and Sealed this

*Twenty-eighth* Day of *May 1985*

[SEAL]

*Attest:*

DONALD J. QUIGG

*Attesting Officer* *Acting Commissioner of Patents and Trademarks*